United States Patent [19]
Klimo

[11] 3,790,874
[45] Feb. 5, 1974

[54] MOTOR DRIVE CONTROL SYSTEM
[75] Inventor: Robert G. Klimo, Parma, Ohio
[73] Assignee: Cleveland Machine Controls, Inc., Cleveland, Ohio
[22] Filed: July 27, 1972
[21] Appl. No.: 275,533

[52] U.S. Cl................ 318/327, 318/490, 324/163, 317/27, 340/248 D, 340/409
[51] Int. Cl.......................... H02p 5/00, H02h 3/04
[58] Field of Search...... 324/163, 173, 174; 317/27; 340/248 R, 248 D, 263, 409, 411; 318/326, 327, 463, 464, 490

[56] References Cited
UNITED STATES PATENTS

| | | | |
|---|---|---|---|
| 3,450,944 | 6/1969 | Burke | 340/263 |
| 3,514,686 | 5/1970 | Shano | 318/327 |
| 3,450,943 | 6/1969 | Burke | 340/263 |
| 3,597,656 | 8/1971 | Douglas | 317/27 R |

*Primary Examiner*—Bernard A. Gilheany
*Assistant Examiner*—Thomas Langer

[57] ABSTRACT

A motor drive control system for driving an electrical motor such that the motor speed is dependent upon an error signal representative of the difference between a desired or reference speed, and a speed signal provided by a DC tachometer generator. The tachometer generator is located in a feedback loop for providing a DC signal having a magnitude that varies with motor speed. A monitoring circuit serves to monitor electrical characteristics of the tachometer generator for purposes of preventing energization of the motor in the event of an unwanted electrical characteristic taking place in the tachometer generator feedback loop. The unwanted characteristic may be an improper connection of the tachometer generator in the feedback loop or a faulty tachometer generator, such as shorted armature windings or an open circuit condition between the tachometer brushes.

19 Claims, 3 Drawing Figures

MOTOR DRIVE CONTROL SYSTEM

This invention relates to the art of motor drive control systems and, more particularly, to an improved system employing a DC tachometer generator in a feedback loop for controlling the speed of an electrical motor and a monitoring circuit for monitoring the electrical characteristics of the tachometer generator feedback loop for purposes of preventing energization or stopping energization of the electrical motor in the event that an undesired electrical characteristic is detected.

Motor drive controls for controlling the operation of electric motors are well known. Typically, such motor drive controls serve to regulate the speed of an electrical motor, such as a DC reversible motor, by comparing a tachometer generator feedback signal with a reference signal and controlling the energization of the motor to vary its speed in its dependence upon the difference between the two signals. Depending upon the application, the tachometer generator may be connected directly to the rotor of the motor so as to produce a DC signal directly representative of the motor speed or may be driven by a mechanism which is, in turn, driven by the motor so as to produce a DC signal which is representative, although indirect, of the motor speed. In either case, reliance is placed by the motor control circuit on the continuous and accurate operation of the tachometer generator. The tachometer generator signal may be lost if, for example, the tachometer generator is improperly connected in the feedback loop, or is short circuited, or a malfunction occurs, such as shorted armature windings or a broken circuit between the armature brushes. In such case, the typical motor drive control system would continuously note an error signal in the difference between the lost tachometer generator signal and a reference signal and increasingly energize the motor to increase the motor speed. This, then, may cause a run away motor condition such that the motor is driven at abnormally high speeds, which may be beyond the design limitations, and present possible safety hazards to an operator.

It is, therefore, a specific object of the present invention to provide an improved motor control system employing a DC tachometer generator in the motor control feedback loop with circuitry for monitoring the tachometer generator to prevent motor energization in the event an undesired electrical characteristic is detected.

It is a still further object of the present invention to provide an improved motor drive control system employing a tachometer generator in its feedback control loop and having monitoring circuitry for shutting down and preventing energization of the motor in the event an undesired electrical characteristic of the tachometer generator is detected.

It is a still further object of the present invention to provide a monitoring circuit for monitoring the operation of a tachometer generator located in the feedback loop of a motor drive control circuit and preventing energization of the controlled motor in the event of an electrical fault condition existing within the tachometer generator.

It is a still further object of the present invention to provide control circuitry for de-energizing a motor driven by a motor drive control circuit in the event of a short circuit of the tachometer generator armature windings, or in the event of a discontinuity between the tachometer brushes.

In accordance with the present invention, the motor drive control system serves to control the speed of an electrical motor, and employs a DC tachometer generator which serves to provide, across its output terminals, a DC signal of a magnitude representative of motor speed. This DC signal is compared with a reference signal, exhibiting a magnitude representative of a desired motor speed. An error signal, representative of a given relationship between the two signals, is developed. The motor drive control circuit controls the amount of energizing power supplied to the motor to vary the motor speed in dependence upon the magnitude of the error signal. A tachometer generator monitoring circuit serves to monitor the tachometer generator circuit for the presence of an undesired electrical characteristic, such as an open or short circuit existing between the tachometer generator terminals due to either a faulty connection with the feedback loop or a malfunction within the tachometer generator itself. Upon detection of such an unwanted electrical characteristic, circuitry is actuated to effect de-energization of or to prevent energization of the electrical motor.

In accordance with a more limited aspect of the present invention, the monitoring circuit includes circuitry for applying a high frequency test signal to the tachometer generator for purposes of detecting either a short circuit condition or an open circuit condition.

In accordance with a still further aspect of the present invention, the test signal is continuously applied to the tachometer generator circuit during the operation of the motor drive control circuit.

It is a still further object of the present invention to provide apparatus for testing an electrodynamic machine for short or open circuit conditions.

In accordance with another aspect of the present invention apparatus is provided for testing an electrodynamic machine having a series circuit including at least one winding interposed between a pair of terminals. The testing apparatus includes circuitry interconnecting the terminals to complete an electrical circuit. An AC test signal is applied so as to flow through the series circuit. An AC voltage detector provides a first output signal so long as an AC voltage is developed across the terminals. A current detector provides a second output signal so long as the test current flows through the electrical circuit. Output indicator means, such as a relay, provides an output indication so long as both the first and second output signals are concurrently present.

The foregoing and other objects and advantages of the invention will become more readily apparent from the following description of the preferred embodiment of the invention as taken in conjunction with the accompanying drawings which are a part hereof and wherein.

Figure 1:
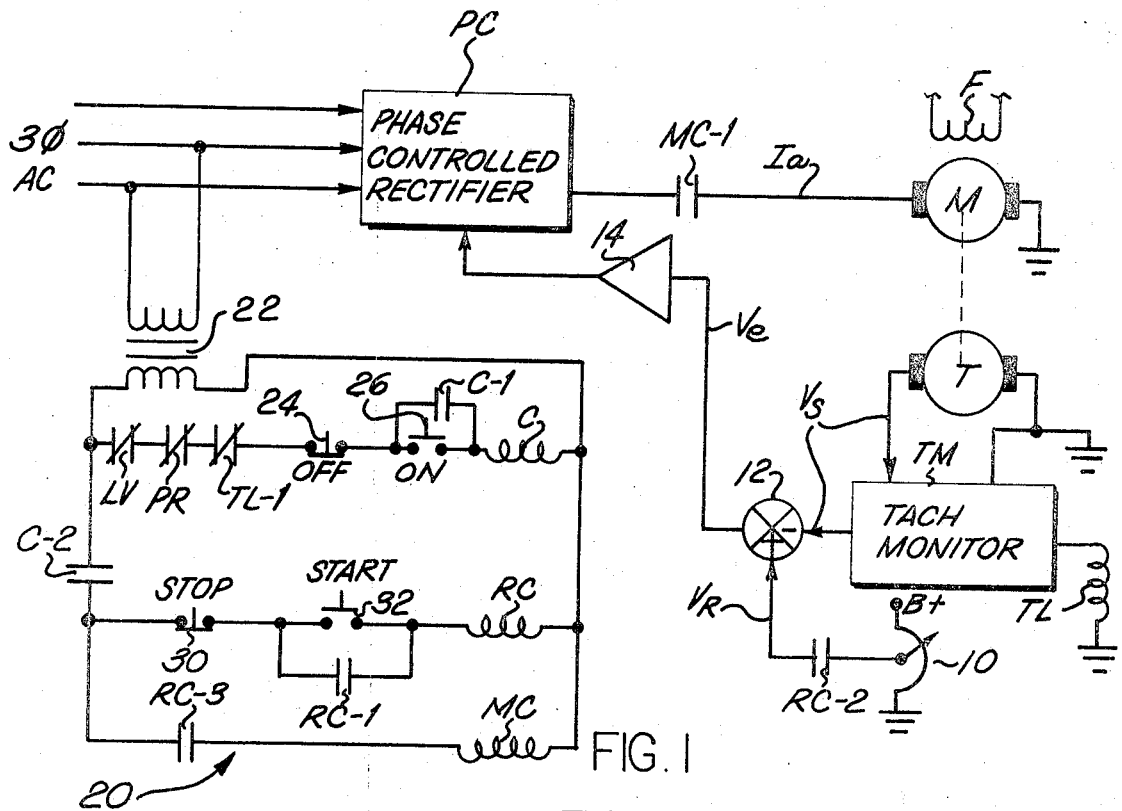
FIG. 1 is a block diagram illustration of the motor drive control system constructed in accordance with the present invention.

Referring now to the drawings, and more particularly to FIG. 1, there is illustrated a motor drive control system constructed in accordance with the present invention for controlling a motor M. The motor to be controlled may be either an AC or DC electric motor; however, for purposes of simplifying the description of the invention, the motor M illustrated herein is a shunt wound, direct current motor. The armature current $I_a$ for motor M is supplied from a phase controlled rectifier PC connected to a three phase alternating current voltage source. The phase controlled rectifier PC serves to provide DC armature current of a magnitude dependent on a control signal applied thereto from a feedback loop in a known manner. For example, one suitable phase controlled rectifier and feedback loop which may be employed in the present invention is that as shown and described in U.S. Pat. to L. Stabile No. 3,421,065. A DC tachometer generator T is driven by the rotor of motor M for purposes of developing a DC signal of a magnitude representative of the motor speed. This DC signal, $V_s$, is compared with a reference signal $V_r$ by means of a comparator 12 to develop an error signal, $V_e$. The error signal $V_e$ is amplified by a suitable amplifier 14 to provide a control signal for application to the phase controlled rectifier PC. The operation is such to increase the motor speed so that the tachometer generator signal $V_s$ increases toward that of the reference signal $V_r$ to minimize the error signal $V_e$. Consequently, by displacing the wiper arm of the potentiometer 10, the reference signal $V_r$ may be increased to command a higher motor speed. The feedback loop serves to provide a speed signal $V_s$ indicative of the increased motor speed for comparison with the reference signal by comparator 12. Conversely, the motor speed may be reduced by adjusting the potentiometer to decrease the magnitude of the reference signal $V_r$.

The motor drive control also includes circuitry 20 which serves to control the start up and stop operation of the motor drive controls. The circuitry obtains AC power through a transformer 22 connected across one phase of the three phase source. Interlock relay contacts LV, PR and TL-1 are connected in series with a normally closed OFF switch 24, a normally open ON switch 26 and a control relay coil C. Upon closure of the ON switch 26, the control relay coil C becomes energized to close its normally open contacts C-1 to provide a holding circuit around switch 26. In addition, energization of relay coil C causes its normally open contacts C-2 to become closed to provide current flow in a second path through a normally closed STOP switch 30 connected in series with a normally open START switch 32 and a RUN control relay coil RC. Once it is decided that the motor control circuitry be started, switch 32 is actuated to complete the series circuit to energize relay coil RC. Energization of relay coil RC causes its normally open relay contacts RC-1 to become closed to provide a holding circuit across the START switch 32 and its normally open relay contacts RC-2 to become closed so that the reference potential $V_r$ will be available to the comparator. In addition, energization of relay coil RC causes its normally open relay contacts RC-3 to become closed to energize a motor control relay coil MC. Energization of this relay coil causes closure of its normally open relay contacts MC-1 connected between the phase control rectifier PC and the armature of motor M so that armature current $I_a$ may be applied to the armature circuit.

The interlock relay contacts LV and PR of the control relay coil circuit are normally closed and are respectively opened upon detection of a low voltage condition or a phase reversal condition, which conditions are monitored by conventional circuitry not illustrated herein. However, interlock relay contacts TL-1 are opened, in accordance with the present invention, when the tachometer monitor circuit TM detects an undesired tachometer characteristic, and de-energizes its normally energized relay coil TL. Upon de-energization of relay coil TL its contacts TL-1 become open. In such case, relay coil C will become de-energized causing its normally open contacts C-1 and C-2 to drop out, whereupon the relay coil RC will become de-energized. When this happens, relay contacts RC-2 become open to remove the reference signal $V_r$ and relay contacts RC-3 become open to de-energize the motor control relay coil MC. This will cause relay contacts MC-1 to open and thereby prevent armature current from being applied by the phase controlled rectifier PC to the armature circuit of motor M. As will be brought out in the description herein, the tachometer monitor TM will prevent initial energization of motor M or cause de-energization of motor M, if relay coil TL is not energized at the time of closure of ON switch 26, or is subsequently de-energized during motor operation.

Figure 2:
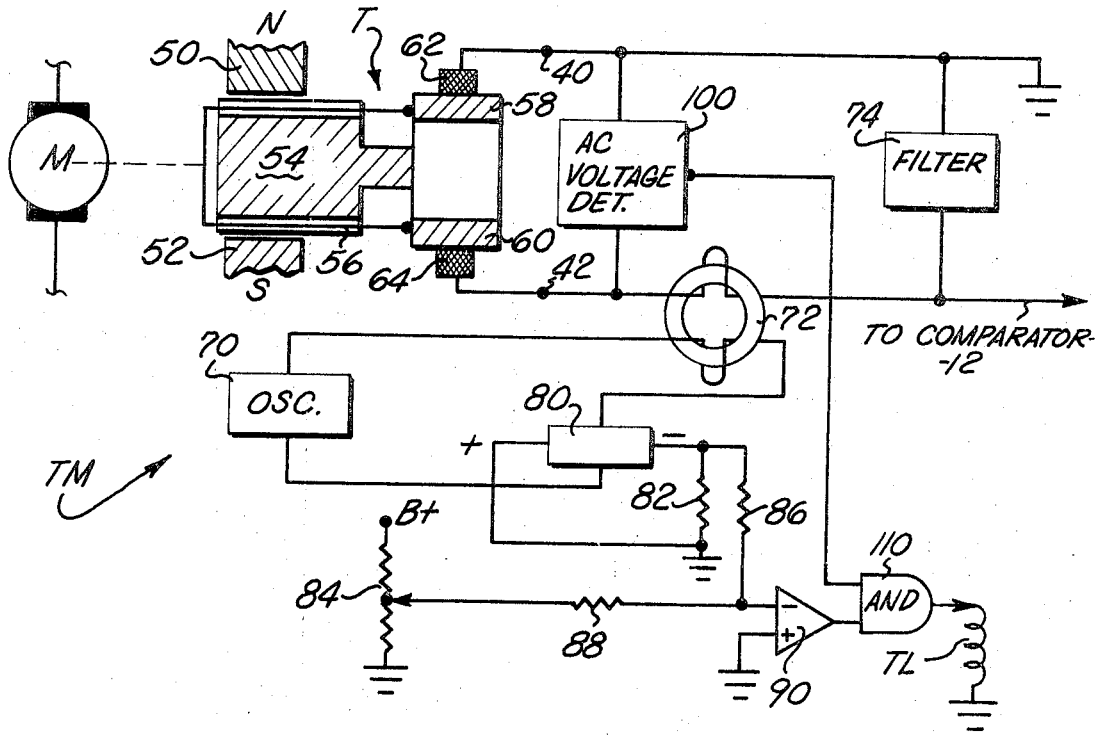
FIG. 2 is a combined schematic-block diagram illustration showing the manner for connecting the monitoring circuit to a DC tachometer generator; and, FIG. 3 is a schematic illustration showing the monitoring circuit in greater detail.

The tachometer monitor circuit is shown in block diagram form in FIG. 2. The monitor circuit TM serves to monitor for undesired electrical characteristics in the tachometer feedback path and, specifically, the conditions existing across the tachometer output terminals 40 and 42. The connection with the drive circuitry may, for example, have terminal 40 connected to ground with terminal 42 connected to the negative input of comparator 12 (see FIG. 1). The tachometer is monitored both before the motor M is energized and during energization of the motor for a malfunction or improper connection in the tachometer loop circuit which would not permit generation of a speed signal.

The determination as to whether the tachometer generator is properly connected at its output terminals 40 and 42 to the feedback loop, or whether a circuit malfunction within the tachometer generator prevents generation of the speed signal, is determined by monitoring whether or not a short circuit or an open circuit condition exists between these two terminals. In accordance with the present invention, a short circuit is detected by determining whether there is a loss of inductance in the armature. An open circuit may indicate that the tachometer is not connected, or the tachometer brushes have failed, resulting in a loss of circuit continuity between the tachometer output terminals. Continuity is checked by passing a high frequency current through the armature circuit of the tachometer generator and sensing whether or not current flows through the circuit. A short circuit condition is checked by determining whether loss of inductance has occurred in the armature windings and this is determined by measuring whether or not an AC voltage is developed across the terminals 40 and 42 when a high frequency test current is applied to the armature windings.

Reference is now made to the tachometer generator T illustrated in FIG. 2. This tachometer generator is illustrated as being a permanent magnet tachometer generator; although, the invention is not limited thereto as other magnetic field generators may be used to provide the magnetic field, such as an electromagnet. Tachometer T employs a permanent magnet, of which only the north and south pole pieces 50 and 52 are shown in the drawing. Positioned between the pole pieces is a rotor 54, having appropriate diametrically opposed slots for receiving a winding 56. For purposes of simplification, only one winding is shown herein, it being understood that a typical tachometer generator employs many rotor slots for carrying many windings. The opposite ends of windings 56 are secured, as by welding, to diametrically opposed commutator bars 58 and 60 mounted on a commutator member driven by rotor 54. Armature brushes 62 and 64 are located on diametrically opposed sides of the commutator and, as shown in the drawings, are electrically connected with commutator bars 58 and 60. Rotor 54 may be directly driven by the rotor of motor M or it may be driven through indirect means, such as a mechanism which is driven by the motor M. In either case, tachometer generator T is driven at a speed representative of that of the motor speed and, as is well known, serves to provide a direct current voltage signal between its output terminals 40 and 42 of a magnitude representative of the motor speed.

In accordance with the present invention, the monitoring circuit employs a high frequency oscillator 70 which serves to provide a high frequency current which is coupled through a transformer 72 to the tachometer generator circuit. Consequently, high frequency current is caused to flow through the armature circuit from the secondary of transformer 72 and, hence, through the circuit including brush 64, commutator bar 60, winding 56, commutator bar 58, brush 62 and through a filter circuit 74, tuned to the oscillator frequency. So long as there is circuit continuity on the secondary side of transformer 72, the impedance will be low and current will flow through both the secondary and primary sides of the transformer. On the primary side of the transformer, there is provided a full wave rectifier 80 which serves, so long as current flows, to provide a voltage across a burden resistor 82. This voltage is representative of the magnitude of the current flowing. If an open circuit occurs on the secondary side of transformer 72 the voltage across the burden resistor 82 will drop. This condition is monitored by comparing the voltage drop across resistor 82 with a reference signal obtained from a potentiometer 84.

The potential obtained from burden resistor 82 is a negative potential, whereas that obtained from potentiometer 84 is a positive potential. These two potentials are applied through respective summing resistors 86 and 88 to a summing point connected to the inverting input of an operational amplifier 90. If the potential developed across resistor 82 is greater than that obtained from the potentiometer 84, a negative potential is applied to the inverting input of the operational amplifier which develops a positive signal on its output circuit. Conversely, if the potential developed across resistor 82 is less than that obtained from the potentiometer 84 the output circuit of operational amplifier 90 will carry a negative signal. Preferably, when the monitor circuit is connected to the tachometer generator, potentiometer 84 is adjusted so that the voltage developed across the burden resistor 82 just exceeds that obtained from potentiometer 84 so that the output circuit of operational amplifier 90 carries a positive signal. The positive signal is representative of continuity between terminals 40 and 42 of the tachometer generator. If the continuity is broken, the voltage developed across the burden resistor 82 will drop so that the reference signal will predominate and the output circuit of operational amplifier 90 will carry a negative signal.

A short circuit condition existing between terminals 40 and 42 is detected by an AC voltage detector 100 connected between the tachometer generator output terminals. The high frequency current provided in the tachometer circuit from oscillator 70 will provide an AC voltage across terminals 40 and 42 so long as there is inductance present in the tachometer circuit. The AC voltage detector 100 produces a positive DC signal which is applied to one input of an AND gate 110. The other input to the AND gate is obtained from the output circuit of operational amplifier 90. So long as continuity is present, operational amplifier 90 applies a positive signal to the AND gate. With both continuity and inductance being present, AND gate 110 energizes relay coil TL. Energization of relay coil TL, in turn, maintains relay contacts TL-1 closed so that motor M may be energized from the phase controlled rectifier PC (see FIG. 1). If, however, the armature windings become shorted, there is no inductive voltage or AC voltage present between terminals 40 and 42 and the positive output signal from the AC voltage detector 100 is lost. Consequently, even though continuity is present, AND gate 110 will not maintain coil TL energized and, hence, relay contacts TL-1 will drop out or open to either prevent energization of motor M or de-energize the motor, if it is in a running condition. Consequently, both continuity and inductance must be present for AND gate 110 to maintain relay coil TL energized.

Figure 3:
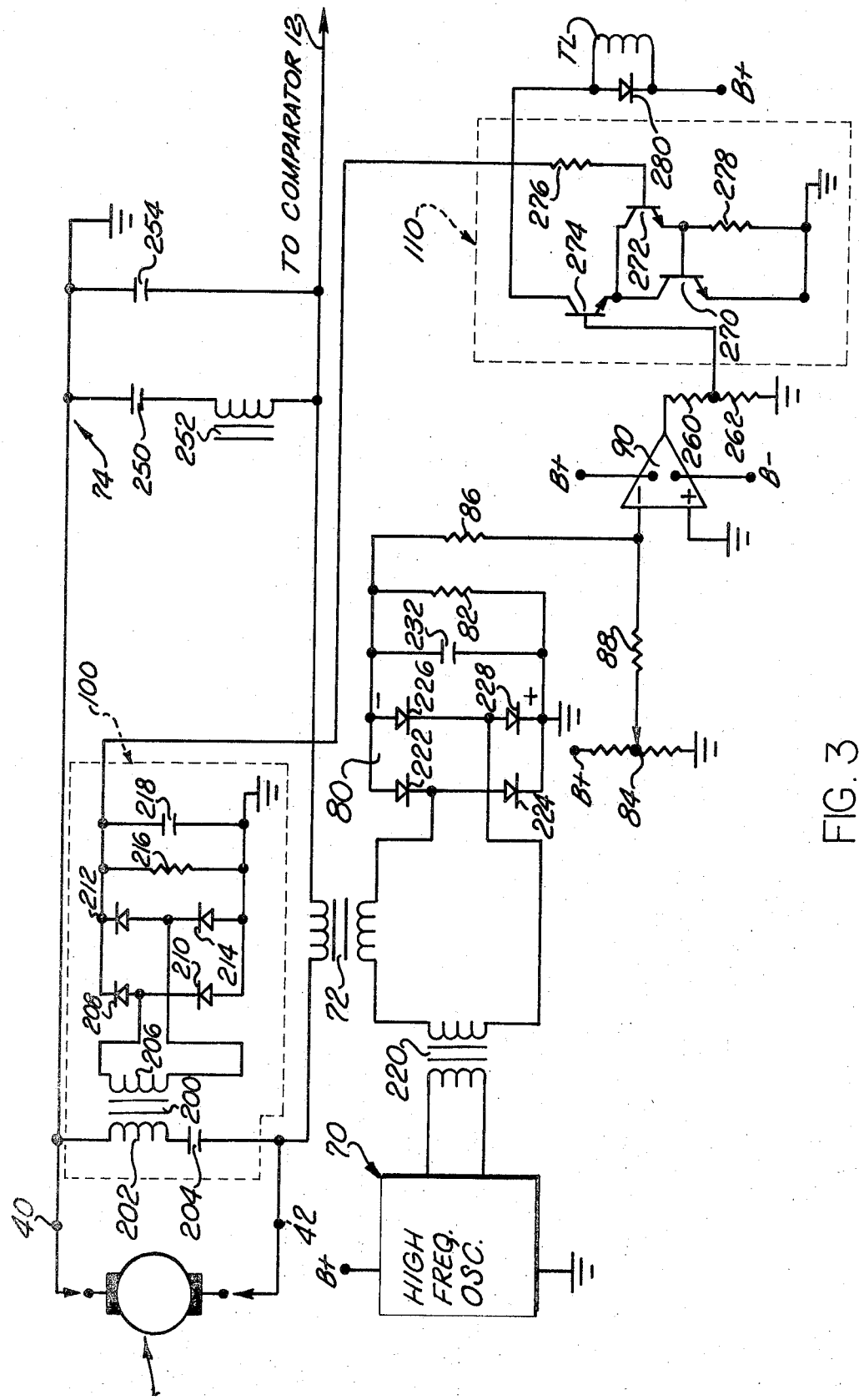

Reference is now made to FIG. 3 which schematically illustrates the tachometer monitor circuit in greater detail than that illustrated in FIGS. 1 and 2. Like components in the various figures are identified with like character references and only the differences will be explained in detail with respect to FIG. 3. The AC voltage detector 100 is connected across tachometer output terminals 40 and 42 and includes a transformer 200 having its primary winding 202 connected in series with a capacitor 204 directly across terminals 40 and 42. The secondary winding 206 on the transformer is connected to a full wave rectifying circuit including diodes 208, 210, 212 and 214, poled as shown, connected in a bridge circuit. A resistor 216 and a smoothing capacitor 218 are connected together in parallel across the output circuit of the bridge rectifier between the junction of diodes 210 and 214 and the junction between diodes 208 and 212. Consequently, so long as inductance is present the AC voltage detector circuit 100 serves to provide a positive DC signal for application to the AND circuit 110.

The current transformer 72 is excited from the high frequency oscillator 70, of conventional construction, which is then transformer coupled through a transformer 220 to transformer 72. Consequently, the secondary winding of transformer 220 and the primary winding of transformer 72 are connected in series with the full wave bridge rectifier circuit 80. The purpose of bridge rectifier 80 is to develop an output voltage so long as there is continuity in the secondary circuit of transformer 72. Rectifier circuit 80 employs diodes 222, 224, 226 and 228, poled as shown in the drawings. The junction of diodes 224 and 228 is referenced to ground. A smoothing capacitor 232 and the burden resistor 82 are connected together in parallel between the junction of diodes 224 and 228 and the junction of diodes 222 and 226. Consequently, a negative voltage with respect to ground is developed by the rectifier circuit for application through the summing resistor 86 to the inverting input of operational amplifier 90.

Filter 74 is tuned to the frequency of the test current provided in the secondary circuit of transformer 72. The filter employs a capacitor 250 and a choke coil 252 connected together in series across terminals 40 and 42. The values of the components employed for capacitor 250 and choke coil 252 are such that the circuit is tuned to a fundamental frequency corresponding with that of oscillator 70. The filter also employs a capacitor 254 connected in parallel with the series circuit of capacitor 250 and choke coil 252 for purposes of filtering harmonics. One end of the filter is referenced to the ground and the other end is connected to comparator 12 to provide the comparator with a DC signal representative of the speed of motor M.

The output signal obtained from the operational amplifier 90 is applied across a voltage divider comprised of resistors 260 and 262. A load voltage will be taken between ground and junction of resistors 260 and 262, and applied as one input to the AND circuit 110. The other input to the AND circuit is taken from the output circuit of the AC voltage detector 100. The AND circuit 110 employs a pair of Darlington connected NPN transistors 270 and 272, together with an NPN transistor 274. The continuity output signal developed across resistor 262 is applied to the base of transistor 274. However, current will now flow through the collector to emitter path unless transistors 272 and 270 are also forward biased. If inductance is present, then the positive signal obtained from the AC voltage detector 100 is applied through resistor 276 to forward bias transistor 272. This, then, provides a forward biasing potential across resistor 278 for the base of transistor 270. Consequently, the transistors will all conduct so that current will flow from the B+ voltage supply source through the relay coil TL and the collector to emitter path of transistor 274, as well as through the collector emitter paths of transistors 272 and 270. A surge suppressing diode 280, poled as shown, is connected across the relay coil TL. So long as continuity is present in the secondary circuit of transformer 72 and inductance is present between terminals 40 and 42, AND circuit 110 serves to energize relay coil TL. If either inductance or continuity is lost, then the AND circuit will be ineffective to maintain the relay coil energized. As discussed previously, when relay coil TL is de-energized its relay contacts TL-1 are open to prevent energization of motor M. In addition, relay coil RC will become de-energized to remove the reference signal $V_r$.

Although the invention has been described with respect to a preferred embodiment, it is to be appreciated that various modifications may be made without departing from the spirit and scope of the invention as defined by the appended claims.

Having thus described the invention, what is claimed is: speed means supplying from said energy terminals signal

1. A motor drive control system for controlling the motor speed of an electrical motor, comprising circuit means including switch means for supplying energy to a said motor through said switch means from a power source, means for varying said motor speed by varying the supply of energy to said motor means in dependence upon a control signal, DC tachometer generater means having a pair of output terminals providing a DC signal therebetween representative of the motor speed, means for providing a said control signal dependent upon a given relationship between said DC signal and a reference level, and monitor circuit means connected to said tachometer generator means for actuating said switch means to prevent said supply of energy to said motor when a given electrical condition exists between said tachometer generator output terminals, said tachometer generator means having a normally completed series circuit extending between said output terminals, said monitoring circuit means including means for applying a test current so as to flow through said series circuit and circuit malfunction detecting means for detecting a circuit malfunction existing between said output terminals.

2. A motor drive control system as set forth in claim 1 wherein said series circuit includes at least an armature winding, a pair of commutator bars connected to said armature winding and a pair of armature brushes respectively connected to said output terminals and positioned so as to make electrical contact with said commutator bars.

3. A motor drive control system as set forth in claim 1 wherein said test current applying means includes circuit means for applying an AC current signal as said test current to said series circuit and said detector circuit means includes AC voltage detector means for detecting whether an AC voltage is present across said output terminals.

4. A motor drive control system as set forth in claim 3 wherein said AC signal applying means includes oscillator means for developing an AC signal and means coupling said oscillator means to said series circuit such that an alternating test current is applied to said series circuit.

5. A motor drive control system as set forth in claim 4 wherein said coupling means includes a current transformer having its primary winding connected to said oscillator means and its secondary winding connected in series with said series circuit.

6. A motor drive control system as set forth in claim 5 including filter means tuned to the frequency of said oscillator means for completing the circuit for said current transformer secondary winding across said tachometer generator output terminals so that current may flow through the completed circuit.

7. A motor drive control system as set forth in claim 3 wherein said AC voltage detector means includes transformer means connected across said tachometer output terminals and rectifying means connected to said transformer means for developing a DC output signal so long as an AC signal is present across said output terminals.

8. A motor drive control system as set forth in claim 7 including means for actuating said switching means to an open condition in response to the absence of said DC output signal from said voltage detecting means to thereby prevent the supply of energy from said power source to said motor.

9. A motor drive control system as set forth in claim 7 wherein said monitoring circuit means includes circuit continuity means for providing a second DC output signal so long as electrical continuity is maintained between said tachometer output terminals, and switch control circuit means for maintaining said switching means in a closed condition to supply power to said DC motor only so long as both said first and said second output signals are concurrently present.

10. A motor drive control system as set forth in claim 1 wherein said circuit malfunction detecting means includes continuity determining means for determining whether electrical continuity is maintained between said tachometer generator output terminals in dependence upon whether said test current flows between said terminals.

11. A motor drive control system as set forth in claim 10 wherein said circuit continuity means includes output circuit means for developing a DC output signal so long as circuit continuity is maintained between said tachometer generator output terminals, and control circuit means for actuating said switching means to an open condition to prevent supply of energy to said motor means in response to the absence of a said output signal.

12. A motor drive control system as set forth in claim 11 wherein said means for applying a test current to said series circuit includes means for providing an AC signal of a given requency as said test current and said malfunction detecting means includes means for providing a DC output signal so long as said AC test signal current flows through said series circuit.

13. A motor drive control system as set forth in claim 12 wherein said malfunction detecting means includes means for comparing said DC output signal with a reference signal to provide a DC output potential of a given polarity so long as said test current flows through said series circuit.

14. A motor drive control system as set forth in claim 13 wherein said malfunction detecting means includes circuit means for developing a second DC output potential only so long as an AC voltage is developed across said tachometer output terminals indicative of inductance being present therebetween.

15. A motor drive control system as set forth in claim 14 including AND circuit means for maintaining said switching means in a closed condition to energize said motor means only so long as both a said first output potential of said given polarity and said second output potential are concurrently provided.

16. Apparatus for testing an electrodynamic machine having a series circuit including at least one winding interposed between a pair of terminals comprising circuit means interconnecting said terminals to complete an electrical circuit thereacross, and including means for applying an AC test signal to flow through said series circuit, AC voltage detecting means for providing a first output signal so long as an AC voltage is developed across said terminals in response to said test signal, current detecting means for providing a second output signal so long as said test current flows through said electrical circuit, and output indicating means for providing an output indication only so long as both said first and second output signals are concurrently present.

17. Apparatus as set forth in claim 16 wherein said AC test signal applying means includes oscillator means for providing an AC signal and means coupling said oscillator means with said electrical circuit such that said AC test signal is caused to flow through said circuit.

18. Apparatus as set forth in claim 17 wherein said AC voltage detecting means includes transformer means connected across said terminals for developing a said AC voltage and rectifying means for providing a DC signal as said first output signal.

19. Apparatus as set forth in claim 17 including AND circuit means for energizing said output indicating means only so long as said first and second output signals are concurrently present.

* * * * *